Nov. 21, 1933.    R. O. WATKINS    1,936,218
CASTING AND HANDLING STORAGE BATTERY GRIDS
Filed Nov. 15, 1930    5 Sheets-Sheet 3
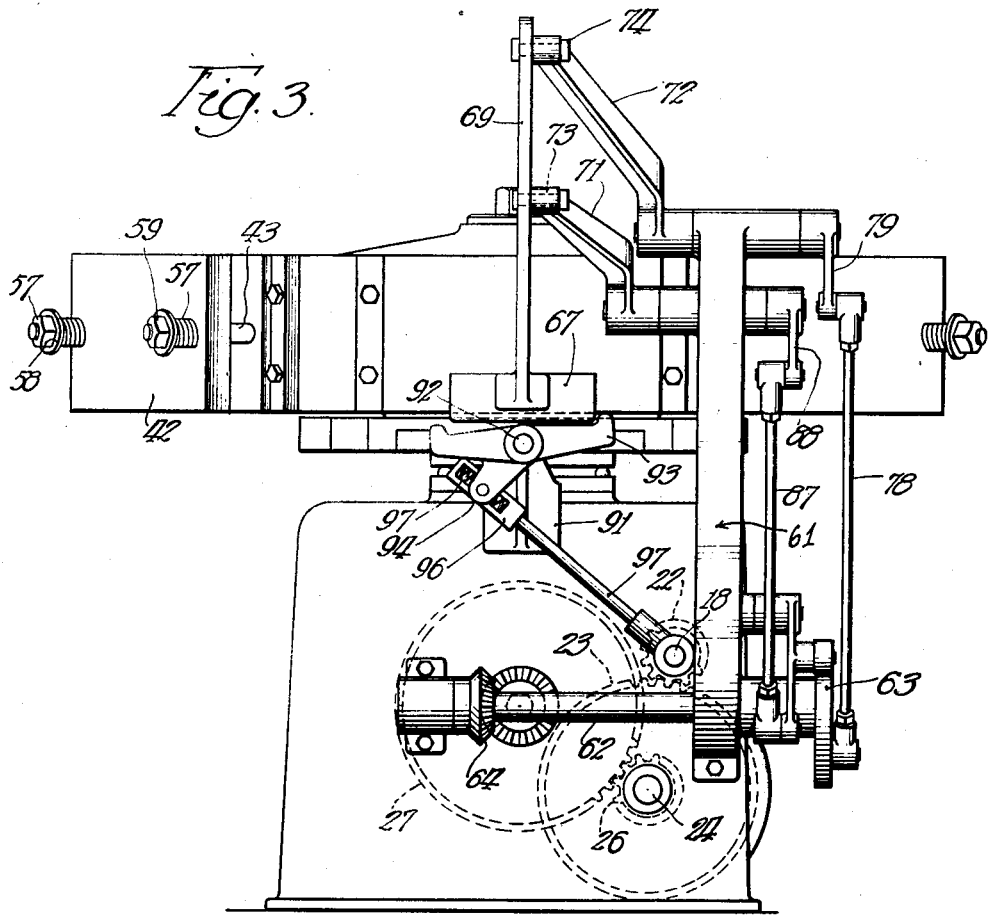
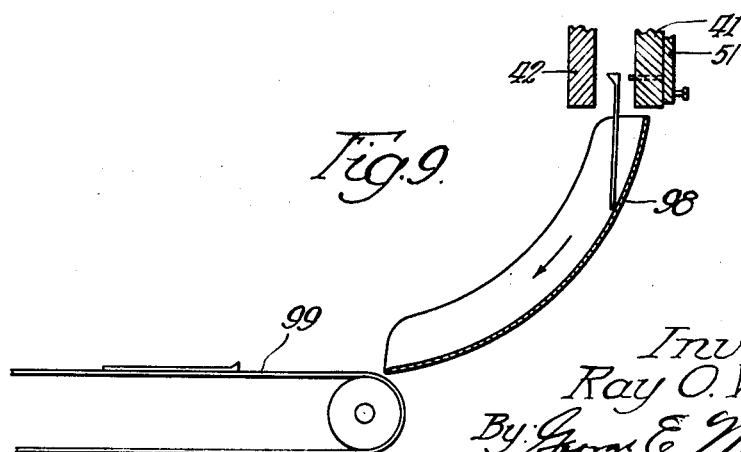
Inventor
Ray O. Watkins
By George E. Mueller
Atty.

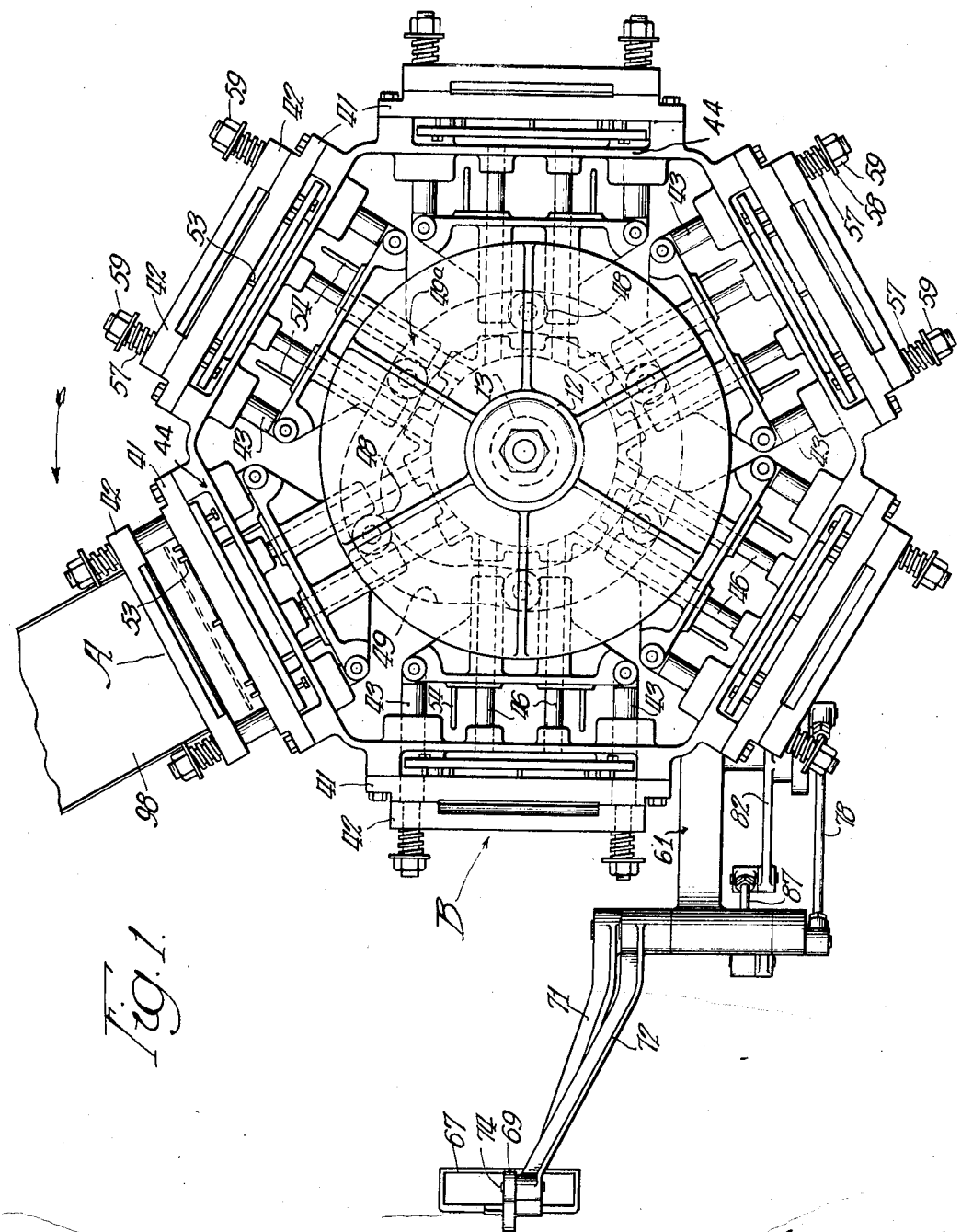

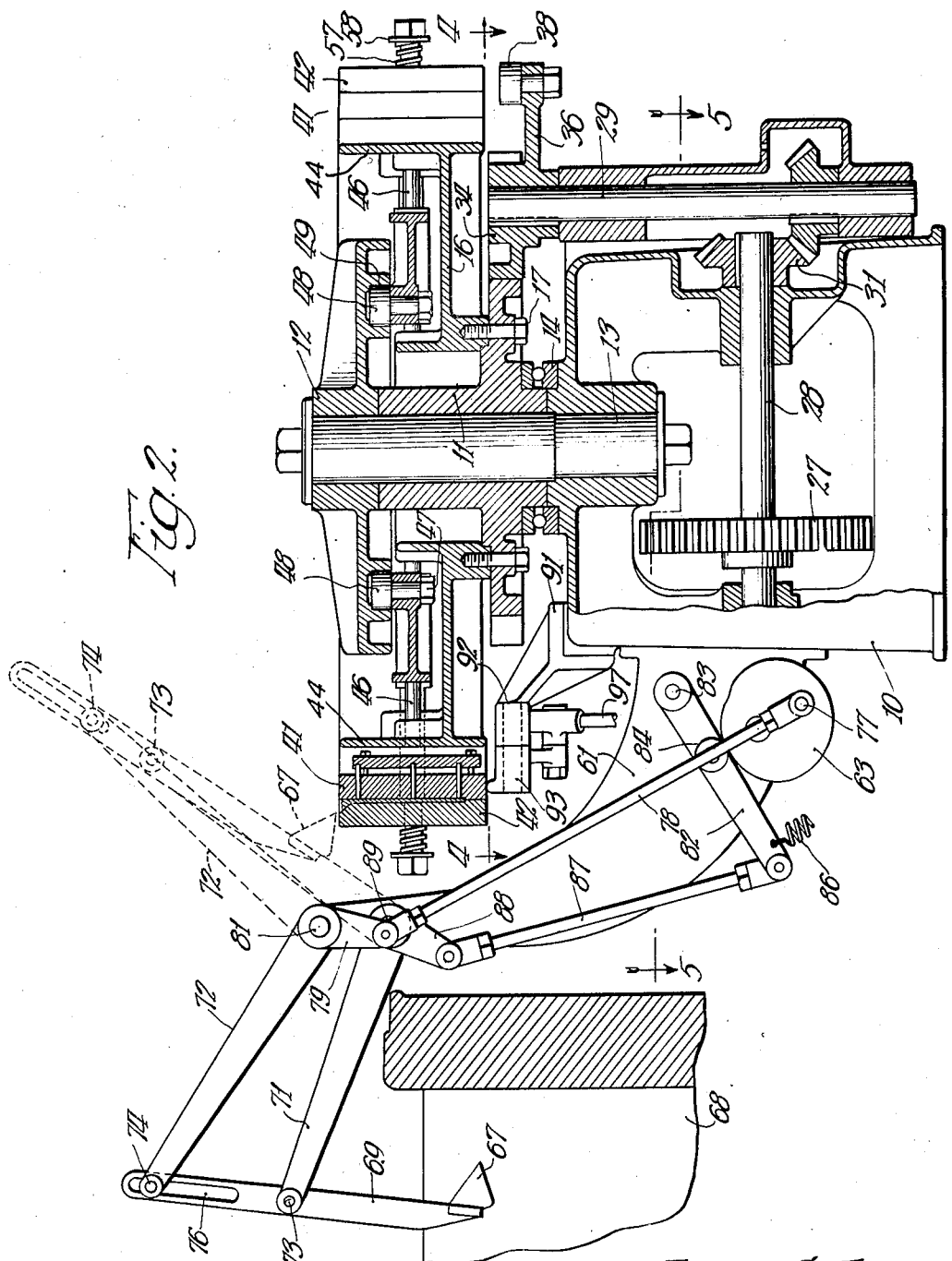

Nov. 21, 1933.  R. O. WATKINS  1,936,218
CASTING AND HANDLING STORAGE BATTERY GRIDS
Filed Nov. 15, 1930   5 Sheets-Sheet 4

Inventor
Ray O. Watkins
By George E. Mueller
Atty.

Nov. 21, 1933.  R. O. WATKINS  1,936,218
CASTING AND HANDLING STORAGE BATTERY GRIDS
Filed Nov. 15, 1930   5 Sheets-Sheet 5
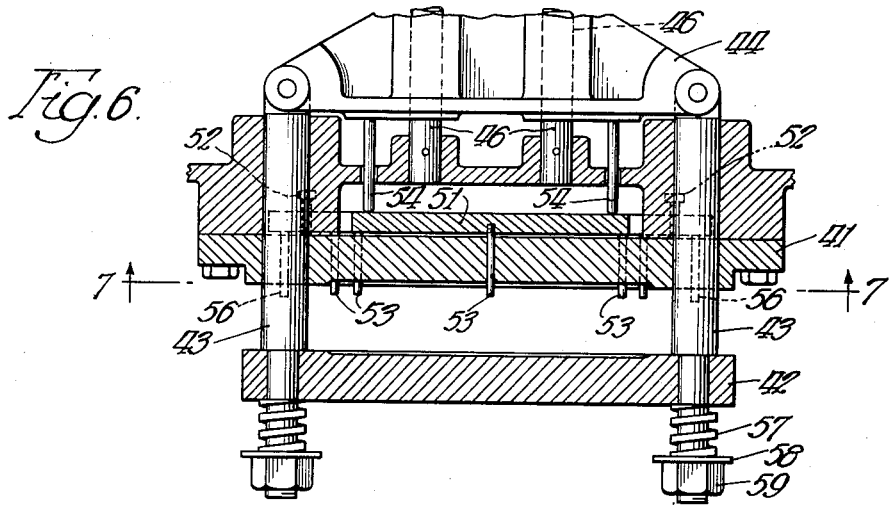
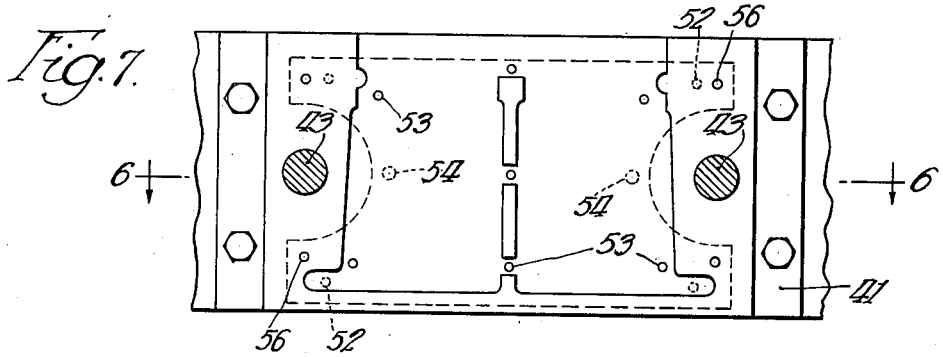
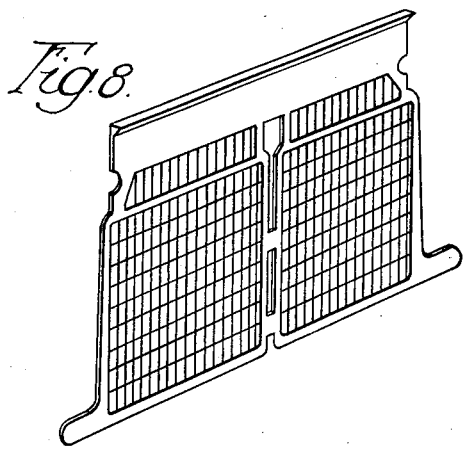
Inventor
Ray O. Watkins
By George E. Mueller
Atty Patented Nov. 21, 1933

1,936,218

UNITED STATES PATENT OFFICE 1,936,218

CASTING AND HANDLING STORAGE BATTERY GRIDS

Ray O. Watkins, Chicago, Ill., assignor to Universal Battery Company, Chicago, Ill., a corporation of Illinois Application November 15, 1930
Serial No. 495,820

4 Claims. (Cl. 22—77)

My invention relates in general to casting machinery and more in particular to improved method of and means for casting and handling storage battery grids.

The principal object of the invention is to produce storage battery grids more economically.

Another object is to produce grids of a more uniform character.

Another object is the construction of a machine for producing storage battery grids, which is adapted to produce the complete grid without the aid of human hands.

Another object is the production of a grid handling mechanism, which is adapted for use with a mechanical casting mechanism.

Another object is to employ a mechanical casting mechanism in connection with grid handling mechanism.

Other objects and features of the invention will be apparent from a consideration of the following detailed description and accompanying drawings.

Figure 4:
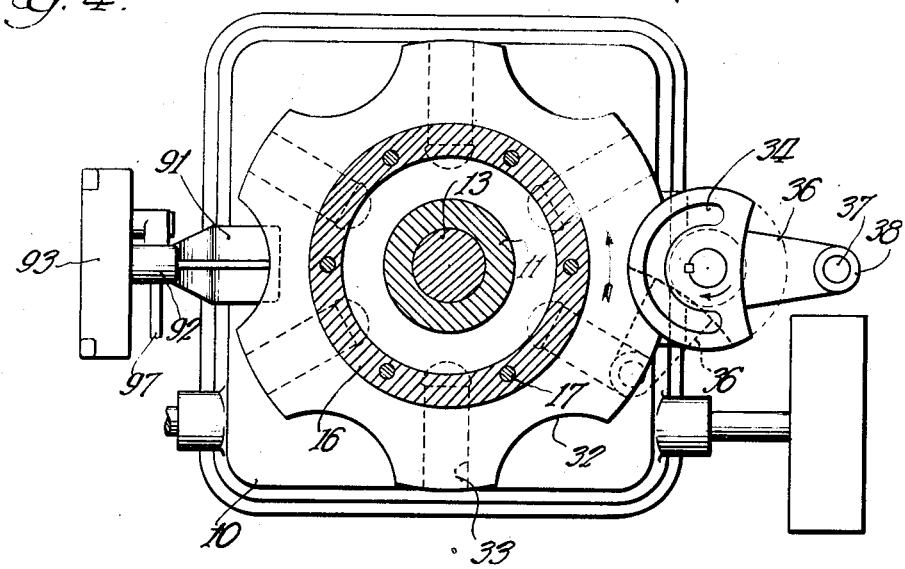
Figure 5:
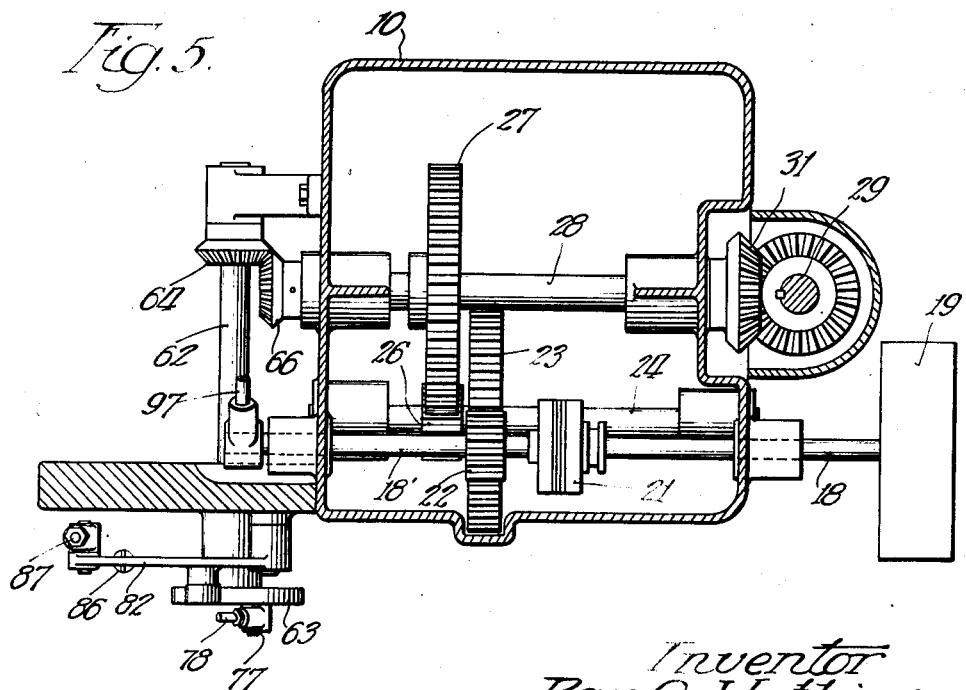

Fig. 1 is a plan view of a machine embodying the main features of my invention,

Fig. 2 is a side elevation of view partly in section showing the casting mechanism, Fig. 3 is an end elevation view, Fig. 4 is a plan sectional view taken along the line 4—4 of Fig. 2, Fig. 5 is an irregular plan section taken along the line 5—5 of Fig. 2, Fig. 6 is an enlarged sectional view of one of the molds, showing the same in open position, the section being taken through the line 6—6 of Fig. 7, Fig. 7 is a vertical sectional view taken along the line 7—7, Fig. 6, Fig. 8 is an enlarged perspective view with one form of grid which may be cast with the machine, and Fig. 9 is a somewhat schematic view showing the manner in which the molds are handled when released at the mold dumping position.

According to the general principles of the invention, a plurality of molds are carried on a rotatably mounted frame, with mechanism provided for intermittently advancing the frame one mold position and then holding the same stationary, so that the molds advance progressively from a pouring position to a dumping position and are maintained stationary at such positions a sufficient length of time to permit all necessary work to be done thereon as to complete emptying of the mold, and filling the same at the filling position.

Suitable means for introducing a charge of molten metal into the mold at the filling or pouring position is provided, the specific embodiment being a manually operated ladle which removes a measured quantity of metal from a lead pot and deposits the same with a pouring action at the opening to the mold. The pouring mechanism is synchronized with the mold driving mechanism, so that the pouring is positive during the stationary period. It also provides means for jarring the mold during the pouring so as to facilitate filling out of the mold to produce a perfect grid casting. Other mold treating expedients such as the "smoking" of the molds, for example, may be used, as fully understood in the art. The expelled grid is deposited on a conveyor mechanism which communicates with suitable means for further treating the grids, as, for example, a stamping mechanism (not shown).

Considering the mold supporting and carrying mechanism first, this includes a base 10, a rotatable frame 11, and a stationary cam carrying frame 12, above the rotatable frame. A central pin or stub shaft 13 is secured rigidly to the two stationary portions and acts as a journal for the rotatable frame 11. A suitable ball bearing 14 is disposed between the rotatable frame and base, acting as a thrust bearing to support the weight of the rotatable frame, and to facilitate rotation thereof.

Regarding the rotatable frame, at each mold position the rotatable frame carried a frame extension the rotatable frame to the frame proper by cap-tension 16 secured to the frame proper by capscrews 17. These frame extensions support the molds and mold opening and closing mechanism as the rotatable frame is driven, and the details of construction and operation thereof will be described more fully hereinafter.

The rotatable frame is intermittently advanced and held stationary, a Geneva drive being utilized for the purpose. This drive, together with the driving means connected thereto will now be referred to.

Referring now to Fig. 5, a main drive shaft 18 is continuously rotated from a suitable power source, for example, a motor 19, a clutch 21 being provided in the shaft 18 for disconnecting the movable parts of the entire grid casting machine from the source of power. I provide speed reducing gearing in order to drive the rotatable mold carrying frame at a proper controlled speed, a speed reducing gearing, including a spur gear 22 secured to the shaft 18' meshes with a larger gear 23 carried on a shaft 24. Shaft 24 carries a smaller gear 26 which meshes with a gear 27 carried on shaft 28. Shaft 28 is connected to a shaft 29 at a direct ratio by means of bevel gears 31, and the shaft 29 drives the mold carrying rotatable frame.

As Fig. 4 shows, the frame casting 11 is provided with a number of arcuate openings 32, regularly spaced about the periphery thereof, and intermediate the arcuate openings 32 are elongated recesses 33. Shaft 29 carries a Geneva drive, including an arcuate locking surface 34, which cooperates with the arcuate openings 32 to hold the frame stationary during a part of the rotation of the shaft 29. An arm 36 also driven with the shaft 29 and integral with the member 34 has an upstanding pin 37 carrying a roller 38, the roller 38 being adapted to engage in the elongated slot 33 as shown in dotted lines in Fig. 4, to drive the mold carrying frame one mold position. At the time the roller 38 engages in the elongated slot 33, the portion 34 is out of engagement with the arcuate edge opening 32, thus unlocking and releasing the mold carrying frame to permit the same to be driven by the driving action of the roller 38.

Now as to the action of the molds, they are held in closed relation throughout their passage around the machine, except at the mold dumping or grid releasing position indicated by the reference character "A" in Fig. 1. At the pouring position "B" the mold is again closed to receive the liquid metal and remains closed throughout its passage around to the mold dumping position again. The details of the mold and the operation thereof will now be set forth.

Each of the molds comprises a stationary portion 41 and a movable portion 42. The movable portion 42 is mounted on bars 43, which are connected to a sliding member 44, adapted to ride along guide bars 46, carried by the frame extension 16. The sliding member 44 carries a vertical pin 47 to the top of which is loosely secured a roller 48, this roller projecting into a cam groove 49 carried on the under surface of the member 12. As Fig. 1 shows, this cam groove is circular, except at the knock-out position, where it extends beyond its normal periphery. Riding in the cam groove, the roller holds the sliding member 44 in an inner position so as to hold the movable mold portion 42 against the portion 41; but at the mold dumping position the sliding member 44 is caused to move outwardly, thus carrying the mold portion 42 away from the mold portion 41, through the connection of the pins or bars 43.

The function of the mechanism disclosed is to eject the grid casting when the mold is opened. To secure this result I employ a knock-out plate 51, which is loosely secured to the mold section 41 by studs 52. This knock-out plate carries knock-out pins 53, adapted to engage the grid at a relatively strong portion thereof to force the grid positively from the mold. The knock-out plate 51 is driven forward by push pins 54 carried by the sliding member 44, and extending through suitable openings in the frame extension 16. The knock-out plate is positively returned to its normal position by means of return pins 56, these pins having one end secured to the knock-out plate 51 and the other end projecting loosely through the mold 41 at a portion thereof not employed to hold the grid casting. When the mold 42 is returned to its position against the mold 41 the return pins 56 are engaged, thus returning the knock-out plate 51 and retracting the knock-out pins 53.

In order to hold the mold 42 firmly in position but at the same time allow for variations in dimensions or for the possibility of a casting being caught in such a way as to interfere with the proper closing of the mold, I employ a construction in which the mold 42 is only loosely supported on the pins or bars 43, springs 57 being secured on extensions of the pins 43, between the mold 42 and a washer 58 backed by a nut 59. When the mold is closed the spring 57 is slightly compressed and so at all times, resiliently but sufficiently firmly holds the mold 42 in proper position.

I shall now describe an embodiment of my grid pouring mechanism which has been found to produce very good results. This mechanism is mounted on a frame 61, which is bolted or otherwise secured to the base 10. A shaft 62 suitably journaled in the frame 61 carries an eccentric roller 63 at one end and a bevelled gear 64 at the other end thereof. The bevelled gear meshes with and is driven by a bevel gear 66 carried on an end extension of the shaft 28. Through the operation of the shaft 62 and mechanism associated therewith, I operate a ladle 67, in such a way as to withdraw liquid metal from a pot 68, as shown in full lines in Fig. 2, and pour the same into the mold at the filling position, as shown in dotted lines in the same figure. The ladle 67 is carried on an arm 69. This arm is controlled by a pair of arms 71 and 72, the arm 71 having a fixed pivot at 73, and the arm 72 having a virtual or shifting pivot point on the arm 69, this being effected by a finger 74, extending into a longitudinal slot 76 on the arm 69. With this construction and mounting of the ladle and the ladle supporting arm I am able to impart substantially any desired motion to the ladle in extending it into the lead pot, withdrawing it, conveying it to the mold and pouring the same into the mold as shown.

In the operation of the ladle and the ladle controlling arms an offcenter pin 77 carried by the cam 63 is connected by means of a rod 78 to a crank 79. This crank is keyed to a short shaft 81, journaled in the top of the casting 61, and the arm 72 is keyed to the opposite end of the shaft 81. Operation of the crank 79 therefore serves to turn the shaft 81 carrying the arm 72 with it.

For operating the arm 71 a lever 82 is pivoted to the frame at 83, and underneath its ends carries a roller 84 adapted to ride on the cam 63; a spring 86 or other suitable means being employed to maintain the roller 84 in engagement with the cam at all times. The free end of the lever 82 has pivoted thereto a link 87, the other end of which is pivoted to a crank 88 secured to a shaft 89 journaled in the casting 61. The arm 71 is secured to the shaft 89 and so the motion of the crank 88, controlled by the lever 82, is conveyed to the arm 71. It is obvious that the shape of the cam 63 determines the action of the arm 71 and I show substantially the shape which I have used in imparting the proper relative motions to the arms 71 and 72 to obtain the effect desired.

I have found that if the mold is agitated or jarred during the pouring, it sometimes assists in obtaining the proper flow of molten metal so as to fill out fully all portions of the mold. I employ a "shaker" mechanism driven at relatively high speed off the main drive shaft. A bracket 91 is secured to the base 10 and carries a stub shaft 92 to which a shaker bar 93 is secured. The shaft also carries a shaker arm 94 with a finger extending into a slot in a member 96, a spring 97 being provided at each side of the finger. Member 96 is carried on a shaker link 97, one end of which is loosely mounted on an offset projecting end of the shaft 18'. The shaft 18' rotating at relatively high speed imparts a fast reciprocating motion to the shaker link 97, which is conveyed through the springs 97 to the shaker bar 93. The ends of the shaker bar strike the bottom of the mold with quick sharp blows, the resilient connection afforded by means of the springs preventing any possibility of injury to the molds or any portion of the mechanism.

In the operation of the mechanism, the mold carrying frame is rotated and held stationary intermittently, the molds being progressed from one mold position to another and sequentially reaching the mold filling position where the pouring mechanism, synchronized with the drive supplies liquid metal to the closed mold while the shaker mechanism operates to impart a sufficient jar to the mold to facilitate the flow of metal. At about the time the pouring has been accomplished, the mold supporting frame is advanced one mold position and during the advancing movement, the ladle is returning to the lead pot to be replenished. At approximately the time that the molds reach their new position the ladle is again in position to fill the newly arrived mold. As the molds move around to the mold dumping position the metal therein gradually cools and solidifies so that when the mold dumping position is reached the grid is entirely solid and sufficiently self-supporting to be handled without danger of being deformed, if handled with ordinary care. As the mold approaches the mold dumping position, the mold 42 is moved away from the mold 41 by the cam action until at approximately the time it reaches the mold dumping position at which it is stationary, the mold is fully opened. As the drawings show, the knock-out plate moves a shorter distance than the mold 42. This relatively shorter movement of the knock-out plate occurs during the last portion of the movement of the mold and consequently the mold is almost fully opened before the knock-out plate is moved forward to engage the grid casting with the knock-out pins. As a consequence, the grid is not actually ejected from the mold until it has substantially reached its stationary position. When forced from the mold it falls by gravity and an arcuate metal chute 98 receives the grid, the grid moving in an arcuate path so that injury thereto is prevented. The chute 98 delivers the grid to a suitable conveyor 99, which carries the grid forward to be operated on according to the following steps in the process. This in actual practice is a stamping operation, which removes excess metal from the edges of the grid and completes the proper formation thereof. This mechanism not being of interest in connection with the present invention is, of course, not shown.

I have described the construction and operation of the mold handling mechanism, stating that the molds are held closed until they reach the dumping position. I have found, however, that in order to impart the maximum cooling effect to the molds while still operating the mechanism at relatively high speed, I can open the molds slightly somewhat in advance of the full open position and so facilitate cooling. The cam 49 is shaped slightly offcenter at 49A to accomplish this result. This characteristic in the cam's shape is not immediately discernible from drawings in the small scale employed, as the movement in the machine itself is not more than approximately one-quarter of an inch, and may be substantially less and the desired results secured.

It is, of course, understood that I am not limited to the number of molds shown, nor to the use of only a single mold pouring and mold dumping position. Obviously, the size of the frame and number of molds thereon may be modified in accordance with specific requirements in the given case. The shape of the cam 49 determines the manner in which the molds will be controlled, and, while I have shown the molds open in only a single position, I may for example keep the molds open throughout a number of positions. For example, two full positions, so that more work can be done thereon should a manufacturer believe it necessary. For example, molds should be smoked and otherwise treated periodically to facilitate a flow of metal therein and a separate open position can be provided for this purpose merely by changing the shape of the cam 49.

I have described the details of one embodiment of my invention in order to make the same clear to those skilled in the art, but it is obvious that I am not restricted to the particular form of apparatus and that the invention is limited only by the scope of pending claims.

What I claim as new and desire to protect by Letters Patent of the United States is:

1. In a grid casting machine, a hollow base frame having a central upwardly projecting stub shaft secured thereto, a mold supporting frame mounted and journaled on said stub shaft, a stationary frame member secured at the top of the stub shaft and above the mold supporting frame, a plurality of bi-part molds carried on said supporting frame peripherally thereof, means including a cam slot formed on the under side of said upper stationary frame for opening and closing said molds as the mold supporting frame is rotated, a vertical drive shaft, connections from said vertical drive shaft to gearing housed in said base frame and adapted to be connected to a source of power, a Geneva drive including an arcuate locking portion and a driving portion comprising an arm carrying a driving roller, said main mold supporting frame having arcuate peripheral slots adapted to be engaged by the locking portion of the Geneva drive, and having radial slots between said arcuate locking portions adapted to be engaged by the driving roller to rotate the mold supporting frame one mold position when the locking portions are disengaged.

2. The combination described in claim 1, including mold pouring mechanism, means for synchronizing the mold pouring mechanism with the mold rotating mechanism, and means for imparting a vibratory movement to the mold while the metal is being poured thereinto, said latter means also being synchronized with the mold advancing means.

3. In a grid casting machine, a rotatable frame, a plurality of plural part molds supported in spaced relation on the periphery of the rotatable frame, means for rotating the frame intermittently to present the molds successively to a mold pouring position where the mold is held stationary, a mold pouring mechanism including a ladle mechanism including a pair of bell crank levers for causing the ladle to dip into molten lead supported in a lead kettle, and to be raised filled with molten lead and to pour the lead by gravity into the mold held stationary at the mold pouring position, a continuously rotating shaft, a drive connection from said shaft to the rotatable frame, and a second drive connection from said shaft to the ladle operating mechanism.

4. In a grid casting machine, a pouring mechanism including a ladle, an arm connected to the ladle, a pair of bell crank levers each having an arm pivoted to said ladle arm, a rod connected to one bell crank arm, a rotatable shaft, a crank connection between the said rod and shaft, a second rod pivoted to the second arm of the second bell crank, and a cam connection between said shaft and rod to impart a differential action thereto to cause the ladle to dip into a lead kettle, raise and move to a mold pouring position and tilt at said position to pour the lead therefrom.

RAY O. WATKINS.